United States Patent Office 2,776,922
Patented Jan. 8, 1957

2,776,922

SYNERGISTIC ZINC MERCAPTOBENZOTHIAZOLE AND ZINC DIMETHYL DITHIOCARBAMATE FUNGICIDAL COMPOSITION

Albert A. Somerville, Carmel, N. Y., assignor to R. T. Vanderbilt Company, Inc., New York, N. Y., a corporation of New York No Drawing. Application March 28, 1951, Serial No. 218,090

3 Claims. (Cl. 167—33)

My invention relates to compositions of matter which are useful as fungicides.

It is known in the art that the zinc salt of 2-mercaptobenzothiazole and the zinc salt of dimethyl dithio carbamic acid possess useful fungicidal properties. I have made the unexpected discovery, however, that mixtures of the zinc salt of 2-mercaptobenzothiazole and the zinc salt of dimethyl dithio carbamic acid possess fungicidal activity to a much greater extent than would reasonably be expected from the properties of the individual aforementioned zinc compounds.

In comparing the fungicidal effectiveness of the mixtures of the present invention with the effectiveness of the separate active ingredients thereof, there was used a method which has been found to be easily reproduced, which gives relatively constant results without involving cumbersome techniques, and which has been applied to a number of fungi with equal efficiencies demonstrated.

The method consisted of a test tube dilution using a nutrient salt solution (composed of 40 grams of dextrose, 2 grams of asparagine, 0.5 gram of potassium dihydrogen phosphate, 0.25 gram of $MgSO_4.7H_2O$, 0.0003 gram of thiamine chloride and 1,000 ml. of distilled water), a spore suspension of *Aspergillus niger* (made from mature, healthy culture tubes by washing a given tube with four aliquots of 5 ml. of distilled water and thereafter diluting the washings with distilled water to a total of 200 ml.) and a solution of the protectant (fungicide).

The dilution test was performed by first adding to a test tube 1 ml. of the nutrient solution, after which 3.50 ml. of the spore suspension was added and the mixture was agitated. The protectant was suspended in a minimum amount of a suitable non-reactive solvent (water or a mixture of water and acetone). In testing the effectiveness of various protectants, varying amounts thereof were added to a given test tube containing the 1 ml. of nutrient solution and the 3.50 ml. of the spore suspension, the final volume of the mixture of nutrient solution, spore suspension and protectant solution in a given test tube being 5 ml. The test tube containing the 5 ml. total mixture was then agitated to attain homogeneity, and by means of a 1 ml. pipette (graduated in 1/100 ml. subdivisions) drops of the mixture were placed on chemically cleaned microscope slides in triplicate.

These slides were placed in large Petri dishes (150 mm. x 20 mm.) containing a quantity of distilled water and a glass rod support which held the slides above the surface of the water. Petri dish covers were placed on the dishes and the spores were then incubated for 48 hours at $30 \pm 1°$ C. The presence of the water in the Petri dishes assured high humidity, thereby preventing the test solutions from drying. At the end of the incubation period, the slides were removed from the Petri dishes and were examined microscopically for signs of germination of the spores. Where no spores had germinated, the protectant at the concentration employed was considered to be completely fungicidal or fungistatic.

The following table contains data obtained using the method just described, the data concerning the relative fungicidal activities of various compositions falling within the scope of the present invention with the effectiveness of the zinc salt of dimethyl dithio carbamic acid and the zinc salt of 2-mercaptobenzothiazole.

| Active Fungicidal Ingredients | | Minimum p. p. m. of active ingredients for zero germination in dilution test |
|---|---|---|
| Wt. Percent zinc dimethyl dithiocarbamate | Wt. Percent zinc salt of 2-mercaptobenzothiazole | |
| 0 | 100 | 500 |
| 1 | 99 | 100 |
| 5 | 95 | 100 |
| 10 | 90 | 20 |
| 25 | 75 | 20 |
| 50 | 50 | 20 |
| 75 | 25 | 10 |
| 90 | 10 | 20 |
| 95 | 5 | 10 |
| 99 | 1 | 50 |
| 100 | 0 | 20 |

A similar series of tests was also run, in this case the organism being a species of Penicillium. The following table sets forth the results of this series of tests.

| Active Fungicidal Ingredients | | Minimum p. p. m. of active ingredients for zero germination in dilution test |
|---|---|---|
| Wt. Percent zinc dimethyl dithiocarbamate | Wt. Percent zinc salt of 2-mercaptobenzothiazole | |
| 0 | 100 | 500 |
| 1 | 99 | 100 |
| 5 | 95 | 50 |
| 10 | 90 | 20 |
| 25 | 75 | 3 |
| 50 | 50 | 3 |
| 75 | 25 | 20 |
| 90 | 10 | 5 |
| 95 | 5 | 5 |
| 99 | 1 | 5 |
| 100 | 0 | 10 |

As is shown by the data contained in the tables, the relative proportions of the active ingredients contained in the fungicidal composition may be varied widely, nevertheless producing mixtures characterized by enhanced activity. Furthermore, the particular organisms towards which the present composition exhibits enhanced properties are not restricted to those particular ones used in making the tests described above.

The present composition may be employed in accordance with procedures which are essentially conventional in the fungicide art. For example, a wettable powder can be prepared as follows: to 520 pounds of a 30% by weight aqueous solution composed of 364 pounds of water and 156 pounds of a mixture of the sodium salt of 2-mercaptobenzothiazole and the sodium salt of dimethyl dithio carbamic acid, the weight ratio of the two sodium salts being 2.25:27.75, respectively, there is added 100 pounds of $ZnSO_4.H_2O$ and 1.6 pounds of concentrated sulfuric acid. From the reaction mixture there precipitates 161 pounds of a mixture of the zinc salt of 2-mercaptobenzothiazole and the zinc salt of dimethyl dithio carbamic acid. This precipitate, after having been separated and dried, is a useful fungicidal powder in itself, although it would not be termed in the art as a wettable one.

In order to prepare the wettable powder, there is blended in a dough mixer the following ingredients: 100 pounds of the dry mixture of zinc salts prepared as described in the preceding paragraph; 7.15 pounds of Silene EF (a proprietary product, being a white, extremely finely divided, precipitated, hydrated calcium silicate); 31.5 pounds of clay; 2.86 pounds of Darvan No. 1 (a proprietary product, being the sodium salt of alkyl naphthalene sulfonic acid) and 1.43 pounds of sodium dodecyl benzene sulfonate.

In another embodiment, the composition of the present invention can also be utilized in the manufacture of mildew resistant cotton fabrics. In order to do this, there is first padded on the fabric a 5% by weight aqueous solution of the 30% by weight aqueous solution containing the sodium salt of 2-mercaptobenzothiazole and the sodium salt of dimethyl dithio carbamic acid, which 30% by weight aqueous solution has already been described above. The fabric is then dried, and then on it there is padded a 1.1% by weight aqueous solution of zinc acetate, after which the fabric is again dried. The sodium salts and zinc acetate react to form on and within the fabric a mixture of zinc salts falling within the scope of the present invention.

I claim:

1. A composition of matter comprising a synergistic fungicidal mixture of the zinc salt of 2-mercaptobenzothiazole and zinc dimethyl dithiocarbamate.

2. A composition of matter comprising a synergistic fungicidal mixture of 1–90% by weight of the zinc salt of 2-mercaptobenzothiazole and 99–10% by weight of zinc dimethyl dithiocarbamate.

3. A composition of matter comprising a synergistic fungicidal mixture of the zinc salt of 2-mercaptobenzothiazole and zinc dimethyl dithiocarbamate in the ratio equivalent to the weight ratio of 2.25:27.75 of the sodium salt of 2-mercaptobenzothiazole to the sodium salt of dimethyl dithiocarbamic acid, respectively.

References Cited in the file of this patent

UNITED STATES PATENTS

| | | |
|---|---|---|
| 1,962,109 | Alvord | June 5, 1934 |
| 1,972,961 | Tisdale | Sept. 11, 1934 |
| 2,614,958 | Somerville | Oct. 21, 1952 |
| 2,614,959 | Somerville | Oct. 21, 1952 |